United States Patent
Muniyappa et al.

(10) Patent No.: US 12,445,971 B2
(45) Date of Patent: Oct. 14, 2025

(54) MANAGING TRANSMIT POWER OF NETWORKING DEVICES

(71) Applicant: HEWLETT PACKARD ENTERPRISE DEVELOPMENT LP, Spring, TX (US)

(72) Inventors: Nethra Muniyappa, Santa Clara, CA (US); Shubham Saloni, Santa Clara, CA (US); Rajarshi Bhattacharyya, Santa Clara, CA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 370 days.

(21) Appl. No.: 18/184,789

(22) Filed: Mar. 16, 2023

(65) Prior Publication Data

US 2024/0314703 A1    Sep. 19, 2024

(51) Int. Cl.
*H04W 52/24* (2009.01)
*H04W 64/00* (2009.01)

(52) U.S. Cl.
CPC ......... *H04W 52/242* (2013.01); *H04W 64/00* (2013.01)

(58) Field of Classification Search
CPC ............................ H04W 52/242; H04W 64/00
See application file for complete search history.

(56) References Cited

U.S. PATENT DOCUMENTS

| | | | |
|---|---|---|---|
| 7,415,262 B2 * | 8/2008 | Liu | H04W 52/325 455/333 |
| 7,433,652 B2 | 10/2008 | Durgin | |
| 7,489,661 B2 | 2/2009 | Hills et al. | |
| 10,716,022 B2 | 7/2020 | Ganu et al. | |
| 10,880,899 B2 | 12/2020 | Kim et al. | |
| 2006/0075131 A1 * | 4/2006 | Douglas | H04W 64/00 709/230 |
| 2015/0063223 A1 * | 3/2015 | Shen | H04W 52/265 370/329 |
| 2015/0146543 A1 * | 5/2015 | Diener | H04W 52/24 370/248 |
| 2016/0241373 A1 * | 8/2016 | Marri Sridhar | G01S 5/14 |

(Continued)

FOREIGN PATENT DOCUMENTS

| | | |
|---|---|---|
| WO | 2017/039521 A1 | 3/2017 |
| WO | 2022/018570 A1 | 1/2022 |

*Primary Examiner* — David Bilodeau
(74) *Attorney, Agent, or Firm* — Hewlett Packard Enterprise Patent Department

(57) ABSTRACT

An example method for managing transmit powers of a networking device is presented. A network management device is configured to determine an expected path loss value at a receiver of a first networking device based at least on the distance between the first networking device and the second networking device. Further, the network management device receives a measured path loss value relative to the second networking device from the first networking device. The network management device then determines a target transmit power for the transmitter of the second networking device based on the measured path loss value and an offset value. The offset value is determined based on the expected path loss value and the measured path loss value. After determining the target transmit power, the network management device sends an instruction to the second networking device to operate the transmitter at the target transmit power.

20 Claims, 5 Drawing Sheets

(56) References Cited

U.S. PATENT DOCUMENTS

| | | | |
|---|---|---|---|
| 2016/0323717 A1* | 11/2016 | Friday | G01S 5/0278 |
| 2020/0028558 A1 | 1/2020 | Yerramalli et al. | |
| 2020/0037337 A1 | 1/2020 | Patwardhan et al. | |
| 2020/0068520 A1* | 2/2020 | Marri Sridhar | H04W 8/005 |
| 2021/0306115 A1* | 9/2021 | Dutta | H04L 1/1607 |
| 2022/0137176 A1* | 5/2022 | Silverman | H04W 4/80 |
| | | | 455/456.1 |
| 2025/0119849 A1* | 4/2025 | Salim | H04W 52/243 |

* cited by examiner

MANAGING TRANSMIT POWER OF NETWORKING DEVICES

BACKGROUND

Equivalent Isotropically Radiated Power (EIRP) represents the total amount of power that a radio (e.g., an antenna) of a wireless device transmits in all directions. In particular, EIRP is a net power transmitted by an antenna after accounting for the gain that the antenna provides and losses from the antenna cable. An EIRP setting (e.g., an EIRP value represented in decibel isotropic (dBi)) for a wireless device determines the maximum signal strength that the wireless device can transmit, which in turn determines the wireless communication range of the wireless device. Generally, the use of higher transmit powers causes increased radio frequency (RF) interferences among wireless devices, especially in dense wireless network deployments. To avoid such RF interferences among different wireless devices, regulatory authorities generally provide guidelines and control measures to limit transmit power levels at various radio frequencies. Therefore, it is useful for wireless network administrators to manage the transmit powers of the wireless devices by configuring respective EIRP settings to optimize the performance of the wireless devices while ensuring compliance with the guidelines on transmit power management.

BRIEF DESCRIPTION OF THE DRAWINGS

One or more examples in the present disclosure are described in detail with reference to the following Figures. The Figures are provided for purposes of illustration only and merely depict examples.

Figure 1:
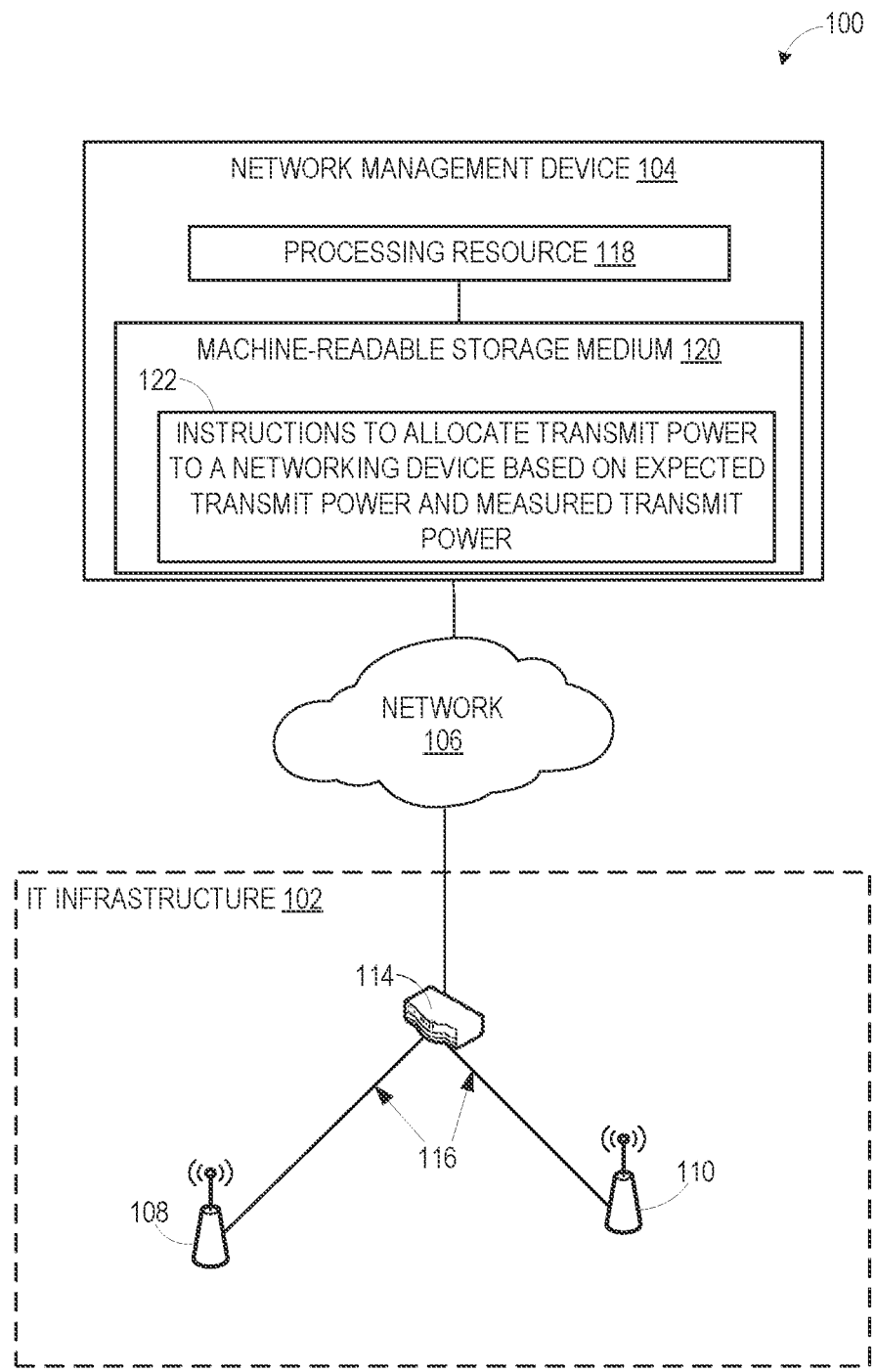
FIG. 1 depicts a block diagram of a networked system in which various of the examples presented herein may be implemented.

The Figures are not exhaustive and do not limit the present disclosure to the precise form disclosed.

DETAILED DESCRIPTION

A management entity, for example, a WLAN controller, a central management application, or an administrator of a WLAN generally determines an EIRP setting for a transmitting wireless device (e.g., an access point) based on a path loss between the transmitting wireless device and a receiving wireless networking device. Path loss or path attenuation is generally defined as a reduction in the power density of an electromagnetic wave (e.g., an RF signal) as it propagates through space. Path loss is affected by surroundings and design limitations, including the air, buildings, and sensitivities of radios' front-end circuits.

Generally, a receiving wireless device measures the path loss based on signals it receives from the transmitting wireless device. Some receiving wireless networking devices may determine a path loss value as a function of the transmit power (TxPower) and received signal strength as represented via Equation (1).

$$\text{Pathloss} = \text{TxPower} - \text{Received Signal Strength} \quad \text{Equation (1)}$$

In another technique, some wireless networking devices may determine the path loss value as a function of the transmit power, signal-to-noise ratio (SNR), and a Noise Floor (NF) as represented via Equation (2). In particular, the signal-to-noise ratio is a measure of comparison between a level of a given signal to a level of background noise. The noise floor for the receiving wireless networking device is a level of background noise that is present before receiving the given signal.

$$\text{Pathloss} = \text{TxPower} - \text{SNR} + \text{NF} \quad \text{Equation (2)}$$

Generally, a cumulative path loss value based on the path loss values reported by several wireless networking devices indicates how dense the wireless network is. For example, a path loss value that is lower than a threshold value may indicate that a wireless network is sparse (i.e., a wireless network that has fewer devices per unit area). On the other hand, a path loss value that is higher than the threshold value may indicate that the wireless network is dense.

Known EIRP assignment techniques use the path loss values reported by the receiving wireless networking device to determine an EIRP setting for the transmitting wireless device. In particular, the density of the wireless network (hereinafter referred to as a network density) has a direct impact on the assigned EIRP for each wireless networking device in the network. For example, if it is determined that the network density is sparse (i.e., higher path loss value), a higher EIRP will be assigned to the wireless networking devices. Whereas, if the network is determined to be dense (i.e., lower path loss value), a lower EIRP will be assigned to the radios.

The signal-to-noise ratio or the received signal strength measurements that determine the path loss value are typically device-dependent parameters. For instance, these measurements are hardware and firmware logic dependent and can vary across multiple different devices from different vendors. In particular, the signal-to-noise ratio and the received signal strength measurements may depend on signal reception over different bandwidths, over different antennas, losses through additional hardware components (e.g., channel and/or frequency band filters), noise floor calculations, or the like. Hence, the way the signal-to-noise ratio and the received signal strength measurements are determined may differ with each chipset vendor. For example, an access point (AP) by one manufacturer may report a higher signal-to-noise ratio compared to an AP by another manufacturer for the same transmitted signal. Although the transmitted signal is the same, the heterogeneity in hardware makes it difficult to have an apple-to-apple comparison.

Such inconsistency in the signal-to-noise ratio and the received signal strength measurements may impact the calculation of the path loss value by wireless devices. For instance, due to the different path loss values reported for similar conditions, EIRP calculations may be inaccurate and as a result, the APs may operate at a higher EIRP setting than required. As it is apparent, with the use of the higher EIRP setting, the chances of RF interferences among wireless devices increase, especially in dense wireless network deployments. Moreover, this can also lead to wireless devices consuming more than the required power.

To solve this issue, a network management device, in examples consistent with the teachings of this disclosure, implements automatic detection of anomalies in the path loss values reported by the receiving wireless devices and dynamically adjusts path loss values. The network management device uses these dynamically adjusted path loss values to determine a target transmit power for the transmitting wireless device. In the description hereinafter, the transmitting and the receiving wireless devices are described as being access points, however, the example presented herein may apply to the wireless devices, without limiting the scope of the present disclosure.

In some examples, the network management device first determines an expected path loss value at a receiver of a first networking device with respect to a transmitter of a second networking device based at least on the distance between the first networking device and the second networking device. The first and second networking devices may be wireless devices (e.g., access points, routers, etc.) that provide wireless connectivity to client devices. In one example, the network management device determines the expected path loss value as a function of the distance between the first networking device and the second networking device and a wavelength of transmitted signals from the second networking device. In another example, the network management device determines the expected path loss value as the distance between the first networking device and the second networking device, the frequency at which the second networking device transmits signals, and one or more of a multipath propagation metric, an attenuation metric, or a noise floor value.

Further, the network management device receives a measured path loss value at the receiver which the network management device compares with the expected path loss value to determine whether the measured path loss value is anomalous. In particular, If the measured path loss value deviates from the expected path loss value by a predefined amount, the network management device determines that the measured path loss value is anomalous. If the measured path loss value is found to be anomalous, the network management device generates a refined path loss value by offsetting the measured path loss value. The network management device then determines a first target transmit power for the transmitter of the second networking device based on the refined path loss value and transmits a first instruction to the second networking device to operate the transmitter at the first target transmit power. If the measured path loss value is not anomalous (i.e., the measured path loss value does not deviate from the expected path loss value by the predefined amount), the network management device determines a second target transmit power based on the measured path loss value and transmits a second instruction to the second networking device to operate the transmitter at the second target transmit power. The first target transmit power and the second target transmit power may be transmitted as EIRP settings to the second networking device.

As will be appreciated, the determination of the transmit power based on an anomaly status of the measured path loss value aids in allocating an amount of the target transmit powers to the networking devices in the network. Accordingly, if for any reason the networking devices report smaller measured path loss values, the network management device may detect an anomaly and adjust the transmit power assignment for the networking devices which otherwise would have assigned a larger EIRP setting. Such allocation of the transmit power/EIRP setting causes the networking devices to reduce power consumption. Also, as the network management device calculates the expected path loss value based on parameters that are independent of device specifics (e.g., receiver sensitivity, measurement algorithms, etc.), the proposed example EIRP allocation overcomes inconsistencies caused by the heterogeneity in hardware makes.

The following detailed description refers to the accompanying drawings. It is to be expressly understood that the drawings are for the purpose of illustration and description only. While several examples are described in this document, modifications, adaptations, and other implementations are possible. Accordingly, the following detailed description does not limit disclosed examples. Instead, the proper scope of the disclosed examples may be defined by the appended claims.

Before describing examples of the disclosed systems and methods in detail, it is useful to describe an example network installation with which these systems and methods might be implemented in various applications. FIG. 1 illustrates a system 100 in which various of the examples presented herein may be implemented. The system 100 may be implemented for any setup, for example, in a home setup or an organization, such as a business, educational institution, governmental entity, healthcare facility, or other organization. The system 100 may include an IT infrastructure 102, or both the IT infrastructure 102 and a network management device 104. In FIG. 1, although the network management device 104 is shown external to the IT infrastructure 102, in some examples, the network management device 104 may be a part of the IT infrastructure 102.

The IT infrastructure 102 may be of a small-scale network of devices or a large-scale network of devices. The small-scale network of devices may be a home network hosting a fewer number of network management devices, for example. The large-scale network of devices may be an organization, university, public utility space (e.g., mall, airport, railway station, bus station, stadium, etc.), or office network hosting a large number of network management devices, for example. The IT infrastructure 102 may span across more than one site, for example, a room, a floor of a building, a building, or any other space that can host network management devices. The IT infrastructure 102 may be a private network, such as a network that may include security and access controls to restrict access to authorized users of the private network.

The IT infrastructure 102 may include several networking devices that communicate with each other and/or with any external device or system outside the IT infrastructure 102. The term networking device as used herein may refer to a device capable of establishing a wireless network through which the client device (not shown) may be able to communicate with each other or any external device or system outside the IT infrastructure 102. Examples of networking devices may include access points, routers, WLAN controllers, and the like. For illustration purposes, the IT infrastructure 102 of FIG. 1 is shown to include two networking devices such as the APs 108 and 110 (hereinafter collectively referred to as APs 108, 110). Further, in some examples, the IT infrastructure 102 may optionally include a networking device such as a controller 114 communicatively coupled to the APs 108, 110, and the network 106. It is to be noted that the examples presented herein are not limited by the specifics (e.g., types and counts) of the devices depicted in FIG. 1.

In some examples, the APs 108, 110, and the controller 114 may be configured to communicate other devices using wireless communication techniques specified in one or more 802.11 standard specifications published by the Institute of Electrical and Electronics Engineers (IEEE). Further, the examples of client devices that can connect to the APs 108, 110 may include desktop computers, laptop computers, servers, web servers, authentication servers, authentication-authorization-accounting (AAA) servers, Domain Name System (DNS) servers, Dynamic Host Configuration Protocol (DHCP) servers, Internet Protocol (IP) servers, Virtual Private Network (VPN) servers, network policy servers, mainframes, tablet computers, e-readers, netbook computers, televisions and similar monitors (e.g., smart TVs), content receivers, set-top boxes, personal digital assistants (PDAs), mobile phones, smartphones, virtual terminals, video game consoles, virtual assistants, Internet-of-Things (IoT) devices, and the like.

The APs 108, 110 may act as a point of access to respective local wireless networks established in IT infrastructure 102 for the client devices. Each of APs 108, 110 may be a combination of hardware, software, and/or firmware that is configured to provide wireless network connectivity to client devices. The APs 108, 110 may communicate with the client devices in accordance with one or more IEEE 802.11 standard specifications. Each of the APs 108, 110 may include a transmitter and/or a receiver to aid in data communication. The transmitter and/or receiver may include signal-processing circuits (e.g., to encode, decode, and/or provide gain) and an antenna. In some implementations, the transmitter and/or receiver in the AP may be combined into a single module called a transceiver. A net power that is radiated via the transmitter of the AP is hereinafter referred to as a transmit power or an EIRP of the transmitter or AP.

Each of the APs 106-108 may communicate with the controller 114 over respective connections 116, which may include wired and/or wireless interfaces. The controller 114 may provide communication with the network 106 for the IT infrastructure 102, though it may not be the only point of communication with the network 106 for the IT infrastructure 102. In some examples, the controller 114 may communicate with the network 106 through a router (not shown). In other implementations, the controller 114 may provide router functionality to the devices in the IT infrastructure 102. In some examples, the controller 114 may be a wireless local area network (WLAN) controller. The controller 114 may be operable to configure and manage networking devices, such as at the IT infrastructure 102, and may also manage networking devices at other remote sites, if any, within the IT infrastructure 102. The controller 114 may be operable to configure and/or manage switches, routers, access points, and/or client devices connected to a network. The controller 114 may itself be, or provide the functionality of, an AP.

The network 106 may be a public or private network, such as the Internet, or another communication network to allow connectivity between the IT infrastructure 102 and the network management device 104. The network 106 may include third-party telecommunication lines, such as phone lines, broadcast coaxial cables, fiber optic cables, satellite communications, cellular communications, and the like. In some examples, the network 106 may include any number of intermediate network management devices, such as switches, routers, gateways, servers, and/or controllers, which are not directly part of the IT infrastructure 102 but that facilitate communication between the various parts of the IT infrastructure 102, and between the IT infrastructure 102 and any other network-connected entities.

The network management device 104 may be hosted on a network outside the IT infrastructure 102, for example, on a cloud platform hosted on a public, private, or hybrid cloud outside the IT infrastructure 102. In some examples, the network management device 104 may be implemented as one or more computing systems, for example, computers, controllers, servers, or storage systems. In certain examples, the network management device 104 may be an electronic device having a hardware processing resource 118, such as one or more central processing units (CPUs), semiconductor-based microprocessors, and/or other hardware devices suitable for retrieval and execution of instructions 122 stored in a machine-readable storage medium 120 (described later). In certain other examples, the network management device 104 may be implemented as a software resource, such as a software application, a virtual machine (VM), a container, a containerized application, or a pod. In some examples, the network management device 104 may be implemented as a service running on a "cloud computing" environment or as a "software as a service" (SaaS). The network management device 104 may be offered as a stand-alone product or a packaged solution that can be utilized on a one-time full product/solution purchase or pay-per-use basis.

In certain examples, not shown in FIG. 1, the network management device 104 may be deployed within the IT infrastructure 102. In such an implementation, the network management device 104 may be connected to controller 114 or any of the APs 108, 110. In some other examples, the network management device 104 may be implemented as an AP. In an alternative implementation, the controller 114 may be configured to operate as the network management device 104.

The machine-readable storage medium 120 may be non-transitory and is alternatively referred to as a non-transitory machine-readable storage medium that does not encompass transitory propagating signals. The machine-readable storage medium 120 may be any electronic, magnetic, optical, or other type of storage device that may store data and/or executable instructions. Examples of the machine-readable storage medium 120 may include Random Access Memory (RAM), non-volatile RAM (NVRAM), an Electrically Erasable Programmable Read-Only Memory (EEPROM), a storage drive (e.g., a solid-state drive (SSD) or a hard disk drive (HDD)), a flash memory, and the like. The machine-readable storage medium 120 may be encoded with instructions 122 to manage the transmit powers of one or more networking devices, for example, the APs 108 and/or 110. Although not shown, in some examples, the machine-readable storage medium 120 may be encoded with certain additional executable instructions to perform any other operations performed by the network management device 104, without limiting the scope of the present disclosure.

The processing resource 118 may be a physical device, for example, a central processing unit (CPU), a microprocessor, a graphics processing unit (GPU), a field-programmable gate array (FPGA), application-specific integrated circuit (ASIC), other hardware devices capable of retrieving and executing instructions stored in the machine-readable storage medium 120, or combinations thereof. The processing resource 118 may fetch, decode, and execute the instructions 122 stored in the machine-readable storage medium 120 to manage the transmit powers of one or more networking devices. As an alternative or in addition to executing the instructions 122, the processing resource 118 may include at least one integrated circuit (IC), control logic, electronic circuits, or combinations thereof that include a number of electronic components for performing the functionalities intended to be performed by the network management device 104. In some examples, when the network management device 104 is implemented as a virtual resource (e.g., a VM, a container, or a software application), the processing resource 118 and the machine-readable storage medium 120 may respectively represent a processing resource and a machine-readable storage medium of a host system hosting the network management device 104 as the virtual resource.

In accordance with some examples, the network management device 104 may implement, by way of the processing resource 118 executing the instructions 122, a method of managing the transmit powers of one or more networking devices. The processing resource 118 may execute one or more of the instructions 122 to perform the method steps described in conjunction with FIGS. 2, 3A, and 3B. In examples consistent with the teachings of this disclosure, the network management device 104 implements automatic detection of anomalies in the path loss values reported by the receiving wireless devices and dynamically adjusts path loss values for any deviations in the path loss values. The network management device 104 uses these dynamically adjusted path loss values to determine a target transmit power for the transmitting wireless device. In the description hereinafter, although both the APs 108 and 110 as transmission and reception capabilities, the AP 110 is described as the transmitting network device, and the AP 108 is described as the receiving network device for illustration purposes.

To ensure that the measured path loss values reported by the receiving networking device (e.g., the AP 108) are reliable, the network management device 104 first determines an expected path loss value at a receiver of the AP 108 with respect to a transmitter of the AP 110 based at least on a distance between the APs 108 and 110. Example details of determining the expected path loss value are described in conjunction with a method of FIG. 2. Further, the network management device 104 compares the measured path loss value with the expected path loss value to determine whether the measured path loss value is anomalous. In particular, If the measured path loss value is outside a predefined range from the expected path loss value, the network management device 104 determines that the measured path loss value is anomalous. If the measured path loss value is found to be anomalous, the network management device 104 generates a refined path loss value by offsetting the measured path loss value.

In particular, if the measured path loss value is found to be anomalous, the network management device 104 determines a first target transmit power for the AP 110 based on the refined path loss value, as opposed conventional technique of determining the transmit power by relying merely on the measured path loss value. The network management device 104 instructs (e.g., by sending an EIRP setting) the AP 110 to operate its transmitter at the first target transmit power. As will be appreciated, the determination of the first transmit power based on an anomaly status of the measured path loss value aids in allocating the right amount of the target transmit power to the networking devices in the network. Accordingly, if for any reason the networking devices such as the AP 108 report smaller measured path loss values, the network management device 104 may detect an anomaly and adjust the transmit power assignment for the networking devices which otherwise would have assigned a larger EIRP setting. Such allocation of the transmit power/ EIRP setting, in accordance with the examples presented herein, causes the networking devices (e.g., the AP 110) to operate without excessive power consumption. Also, as the network management device 104 calculates the expected path loss value based on parameters that are independent of device specifics (e.g., receiver sensitivity, measurement algorithms, etc.), the proposed example EIRP allocation overcomes inconsistencies caused by the heterogeneity in hardware makes.

Figure 2:
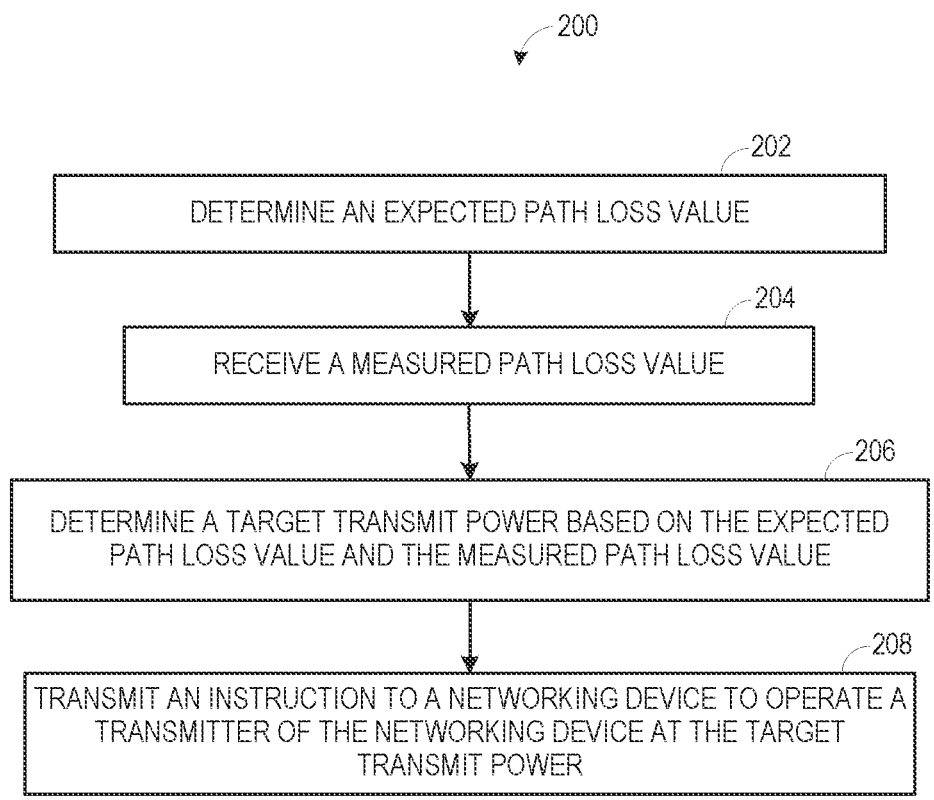
FIG. 2 depicts a flowchart of an example method for assigning a transmit power to a networking device.
Figure 3A:
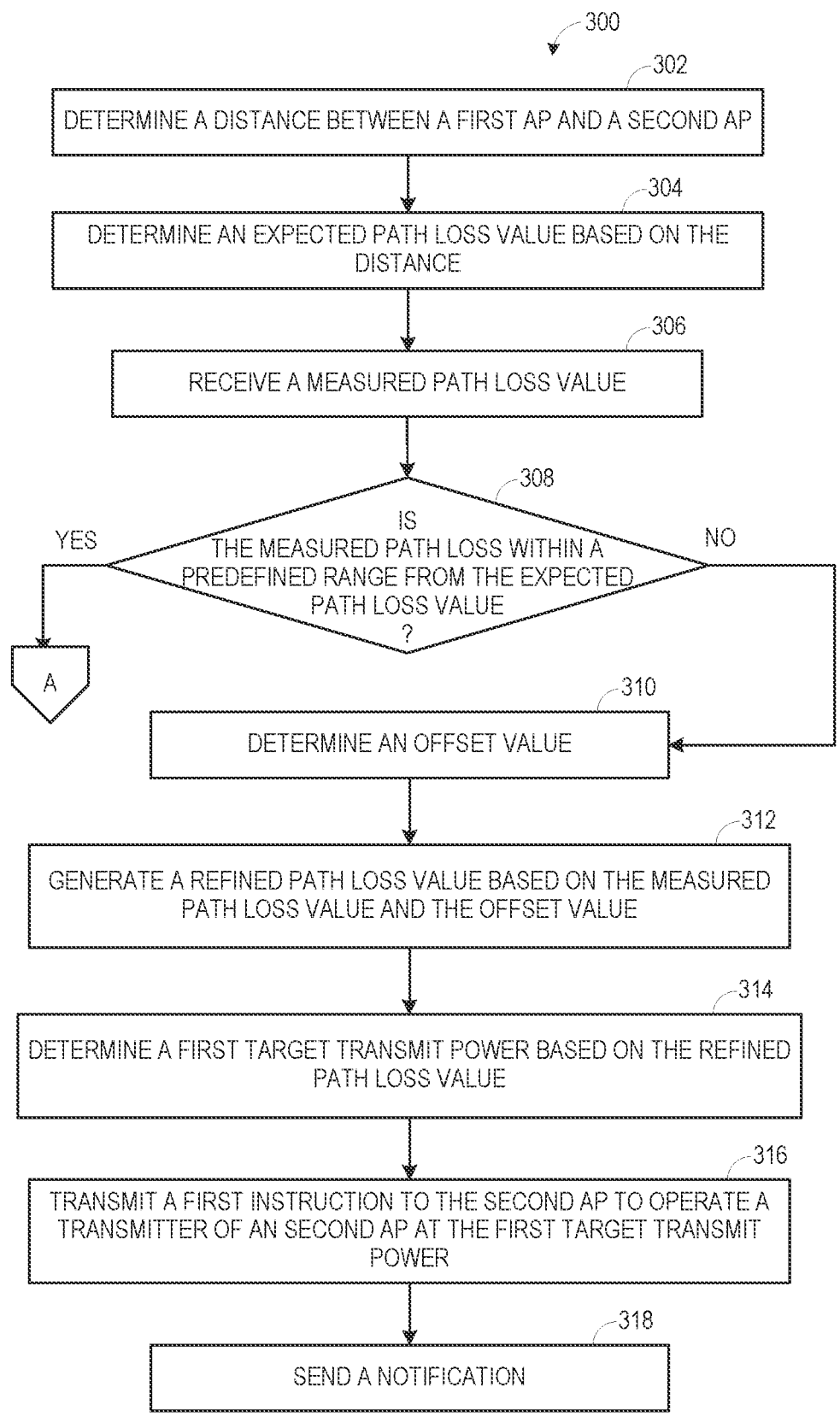
FIGS. 3A and 3B depict a flowchart of an example detailed method for assigning a transmit power to an access point.
Figure 3B:
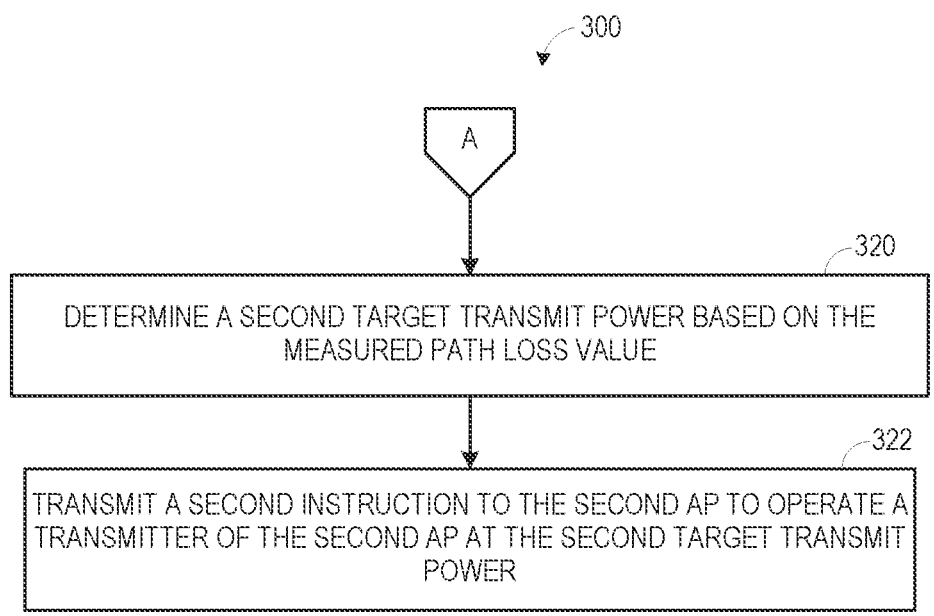

Additional details of managing the transmit power of the networking devices are described in conjunction with the methods described in FIGS. 2, 3A, and 3B.

Referring now to FIG. 2, a flowchart of an example method 200 for managing the transmit powers of the networking devices is depicted. In some examples, the steps shown in FIG. 2 may be performed by any suitable device, such as a network management device (e.g., the network management device 104) or a controller (e.g., the controller 114). In some examples, the suitable device may include a processing resource suitable for retrieval and execution of instructions (e.g., the instructions 122 depicted in FIG. 1) stored in a machine-readable storage medium. The processing resource and the machine-readable storage medium may be example representatives of the processing resource 118 and the machine-readable storage medium 120 of the network management device 104. As an alternative or in addition to retrieving and executing instructions, the processing resource may include one or more electronic circuits that include electronic components for performing the functionality of one or more instructions, such as an FPGA, ASIC, or other electronic circuits.

At step 202, the network management device determines an expected path loss value at a receiver of a first networking device (e.g., a receiving network device, such as, an AP 108) with respect to a transmitter of a second networking device (e.g., a transmitting network device, such as an AP 110). The network management device determines the expected path loss value based at least on the distance between the first networking device and the second networking device.

In one example, the network management device may determine the expected path loss value (EPL) as a free-space path loss ($FPL_d$) for a distance d between the first networking device and the second networking device. The free-space path loss ($FPL_d$) may be determined based on the distance (d) and a wavelength (or frequency) of transmitted signals from the second networking device. Equation (3) represented below shows an example calculation of the free-space path loss.

$$EPL = FPL_d = \frac{4\pi d}{\lambda} \qquad \text{Equation (3)}$$

As it is understood, various channel-related and environmental conditions may impact propagating signals. For example, conditions such as a multipath propagation metric, an attenuation metric, noise floor value, and physical restrictions (e.g., building walls) may attenuate the signal. The IEEE published channel models for 802.11n, 802.11ac, 802.11ax, and 802.11be Standard Specifications to account for various channel conditions on the propagating RF signals. One or more of these models may be utilized to calculate the expected path loss values. For example, the network management device may determine the expected path loss value based on the free-space path loss ($FPL_{bpd}$) for a breakpoint distance (bpd), and a decay factor (DF) (also referred to as a slope). In particular, in one example, up to the breakpoint distance between the first networking device and the second networking device, the expected path loss value (EPL) may be considered the same as the free-space path loss (FPL) (see Equation (4A)). For the distance beyond the breakpoint distance, the expected path loss value may be determined based on the decay factor, for example, using a relationship of Equation (4B).

$$EPL = FPL_{bdp} \text{ for } d = bpd \quad \text{Equation (4A)}$$

$$EPL = FPL_{bpd} + DF \text{ for } d > bpd \quad \text{Equation (4B)}$$

$$\text{wherein } DF = 35 \log10 \left(\frac{d}{bpd}\right)$$

Alternatively, in some examples, the network management device may implement any of the channel models defined in the currently existing IEEE Standards or any future IEEE standards to determine the expected path loss value. For example, for a 6 GHz deployment, the network management device may be configured to implement a channel model that is defined in the IEEE 802.11be Standard Specification.

Further, at step 204, the network management device receives a measured path loss value from the first networking device. The wireless networking devices such as APs may calculate a path loss value for the received signal. As such, for a signal received from the second networking device, the first networking device may be configured to measure the path loss value relative to the second networking device. By way of example, the first networking device may extract information about a transmit power from the received signal and calculate received signal strength for the received signal. The first networking device may then compare the transmit power with the received signal strength to calculate a path loss value (see Equation (1)). In another example, the second networking device may determine the path loss value as a function of the transmit power, signal-to-noise ratio (SNR), and a Noise Floor (NF) (see Equation (2)). It is to be noted that the examples presented herein are not limited with respect to techniques that the first networking device implements to measure the path loss values. Once calculated, the first network device reports the measured path loss value to the network management device.

Furthermore, at step 206, the network management device determines a target transmit power for the transmitter of the second networking device based on the measured path loss value and an offset value. The network management device determines the offset value as a function of one or both of the measured path loss value and the expected path loss value. Example techniques of calculating the offset value are described in conjunction with the method of FIGS. 3A and 3B. To calculate the target transmit power, the network management device may calculate a refined path loss value based on the offset value and the measured path loss value and then calculate the target transmit power as a function of the refined path loss value. In some examples, the network management device may determine a network density based on the refined path loss value and use the network density to determine the target transmit power. It may be noted that the scope of the present disclosure is not limited with respect to the calculation of the transmit power based on path loss value.

Once the transmit power is determined, at step 208, the network management device transmits a power management instruction to the second networking device to cause the second networking device to operate its transmitter at the target transmit power. In particular, the power management instruction may include an EIRP setting representing the target transmit power for the transmitter. Upon receiving the power management instruction, the second networking device may adjust its net operating transmit power to match the target transmit power. In some other examples, the power management instruction may include a command to increase or decrease the transmit power of the second networking device by a predetermined amount. In one example, the predetermined amount may be equivalent to a difference between the target transmit power and the net operating transmit power of the second networking device.

Referring now to FIGS. 3A and 3B, a flowchart of an example method 300 for managing the transmit powers of networking devices is presented. In some examples, the steps shown in FIGS. 3A and 3B may be performed by any suitable device, such as a network management device (e.g., the network management device 104) or a controller (e.g., the controller 114). In some examples, the suitable device may include a hardware processing resource, such as one or more central processing units (CPUs), semiconductor-based microprocessors, and/or other hardware devices suitable for retrieval and execution of instructions (e.g., the instructions 122 depicted in FIG. 1) stored in a machine-readable storage medium. The processing resource may fetch, decode, and execute instructions, to manage the transmit powers of networking devices, for example, access points. As an alternative or in addition to retrieving and executing instructions, the processing resource may include one or more electronic circuits that include electronic components for performing the functionality of one or more instructions, such as an FPGA, ASIC, or other electronic circuits. The processing resource and the machine-readable storage medium may be example representatives of the processing resource 118 and the machine-readable storage medium 120 of the network management device 104.

At step 302, the network management device determines a distance between the first networking device and the second networking device. For the purpose of illustration, the first networking device may be represented as a receiving network device, for example, the AP 108, and the second networking device may be represented as a transmitting network device, for example, the AP 110 depicted in FIG. 1.

In one example, the network management device may determine the distance between the first networking device and the second networking device based on a floor plan locating the first networking device and the second networking device. The floor plan may be stored in a storage device that is accessible by the network management device or locally in the machine-readable storage medium of the network management device. The network management device may determine the distance based on the location data (e.g., location coordinates) marked on the floor plan.

In another example, the network management device may instruct the first networking device and/or the second networking device to perform a Fine Timing Measurement (FTM) and report its result to the network management device. The network management device may then utilize such FTM results to calculate the distance between the first networking device and the second networking device.

In another example, a network administrator may be asked to submit, via a user interface, location information (e.g., geographic coordinates) of networking devices at the time of installing the networking devices. The network management device may be configured to access such installation data of the networking devices to extract the respective location information and use such location information to calculate the distance between the first networking device and the second networking device.

In yet another example, the networking devices may be configured with Global Positioning System (GPS) sensors to determine respective locations (e.g., in the form of longitude, latitude, and/or altitude) and report the same to the network management device. The network management device may use reported locations to calculate the distance between the first networking device and the second networking device.

Further, at step 304, the network management device determines an expected path loss value at a receiver of a first networking device with respect to a transmitter of a second networking device based at least on the distance between the first networking device and the second networking device. Example techniques described in conjunction with step 202 of FIG. 2 may be implemented to determine the expected path loss value at step 304. Further, at step 306, the network management device receives a measured path loss value from the first networking device.

Moreover, at step 308, the network management device performs a check to determine whether the measured path loss value is within a predefined range from the expected path loss value. The predefined range may be customizable and defined by a network administrator. By way of example, the predefined range may be ±20% or ±15 dB from the expected path loss value. In some examples, the predefined range may vary depending on the infrastructure in which the wireless networking devices are deployed. For instance, in a dense set-up such as an office or a school, the predefined range may be set to ±4 dB, whereas in a large-scale setup such as a stadium the predefined range may be set to ±10 dB. The measured path loss value being outside the predefined range from the expected path loss value may indicate that the measured path loss value may be anomalous. To regulate the transmit power of the AP 110, it is useful that the network management device makes certain adjustments to the calculation of the path loss to account for an anomaly in the measured path loss value. Accordingly, at step 308, if it is determined that the measured path loss value is outside the predefined range from the expected path loss value, at step 310, the network management device determines an offset value based on the expected path loss value and the measured path loss value. The offset value may be represented as a function of the measured path loss value and the expected path loss value.

In one example, the offset value ($OV_1$) may be a path loss difference between the expected path loss value (EPL) and the measured path loss value (MPL) represented via Equation (5).

$$OV_1 = EPL - MPL \qquad \text{Equation (5)}$$

In another example, the offset value may ($OV_2$) be a fraction (F) of the path loss difference represented via Equation (6) to accommodate any error margin in the calculation of the expected path loss.

$$OV_2 = F(EPL - MPL) \qquad \text{Equation (6)}$$

The network management device may determine the fraction (F) based on the path loss difference. For example, the network management device may be configured to select a higher fraction of the path loss difference as the offset value for higher values of the path loss difference, or vice-versa. In some examples, the fraction (F) may be defined and/or customized by a network administrator.

In yet another example, the offset value may ($OV_3$) be determined as an absolute difference between the expected path loss value and an average of the expected path loss value (EPL) and the measured path loss value (MPL). The offset value may ($OV_3$) may be represented via an example relationship of Equation (7).

$$OV_3 = |EPL - AVG(EPL - MPL)| \qquad \text{Equation (7)}$$

After the offset value (e.g., any of $OV_1$, $OV_2$, or $OV_3$) is determined, the network management device, at step 312, determines a refined path loss value. If the measured path loss value is smaller than the expected path loss value, then the network management device determines the refined path loss value by adding the offset value to the measured path loss value. Accordingly, the refined path loss value may be represented as a sum of the measured path loss value and the offset value. However, if the measured path loss value is greater than the expected path loss value, then the network management device determines the refined path loss value by subtracting the offset value from the measured path loss value. Accordingly, the refined path loss value may be represented as the difference between the measured path loss value and the offset value.

Furthermore, at step 314, the network management device determines a first target transmit power for the transmitter of the second networking device based on the refined path loss value.

Once the first transmit power is determined, at step 316, the network management device transmits a first power management instruction to the second networking device to cause the second networking device to operate its transmitter at the first target transmit power. In particular, the power management instruction may include a first EIRP setting representing the first target transmit power for the transmitter. Upon receiving the first power management instruction, the second networking device may adjust its net operating transmit power to match the first target transmit power.

Further, at step 318, the network management device notifies the network administrator that the measured path loss value has been refined. The network management device may electronically communicate a notification to the network administrator. The notification may be sent using one or more messaging techniques, including but not limited to, displaying an alert message on a display, via a text message such as a short message service (SMS), a Multimedia Messaging Service (MMS), and/or an email, via an audio alarm, video, or an audio-visual alarm, a phone call, etc. Upon receiving the notification, the network administrator may take corrective action. For example, such notification may aid the network administrator in troubleshooting any issue, such as, inaccurate computations of signal-to-noise ratio and/or received signal strength, defective antennas, or any anomalies due to any hardware change, associated with the second networking device.

Returning to step 308, if it is determined that the measured path loss value is within the predefined range from the expected path loss value, at step 320, the network management device determines a second target transmit power for the transmitter of the second networking device based on the measured path loss value.

Once the second transmit power is determined, at step 322, the network management device transmits a second power management instruction to the second networking device to cause the second networking device to operate its transmitter at the second target transmit power. In particular, the second power management instruction may include a second EIRP setting representing the second target transmit power for the transmitter. Upon receiving the second power management instruction, the second networking device may adjust its net operating transmit power to match the second target transmit power.

Figure 4:
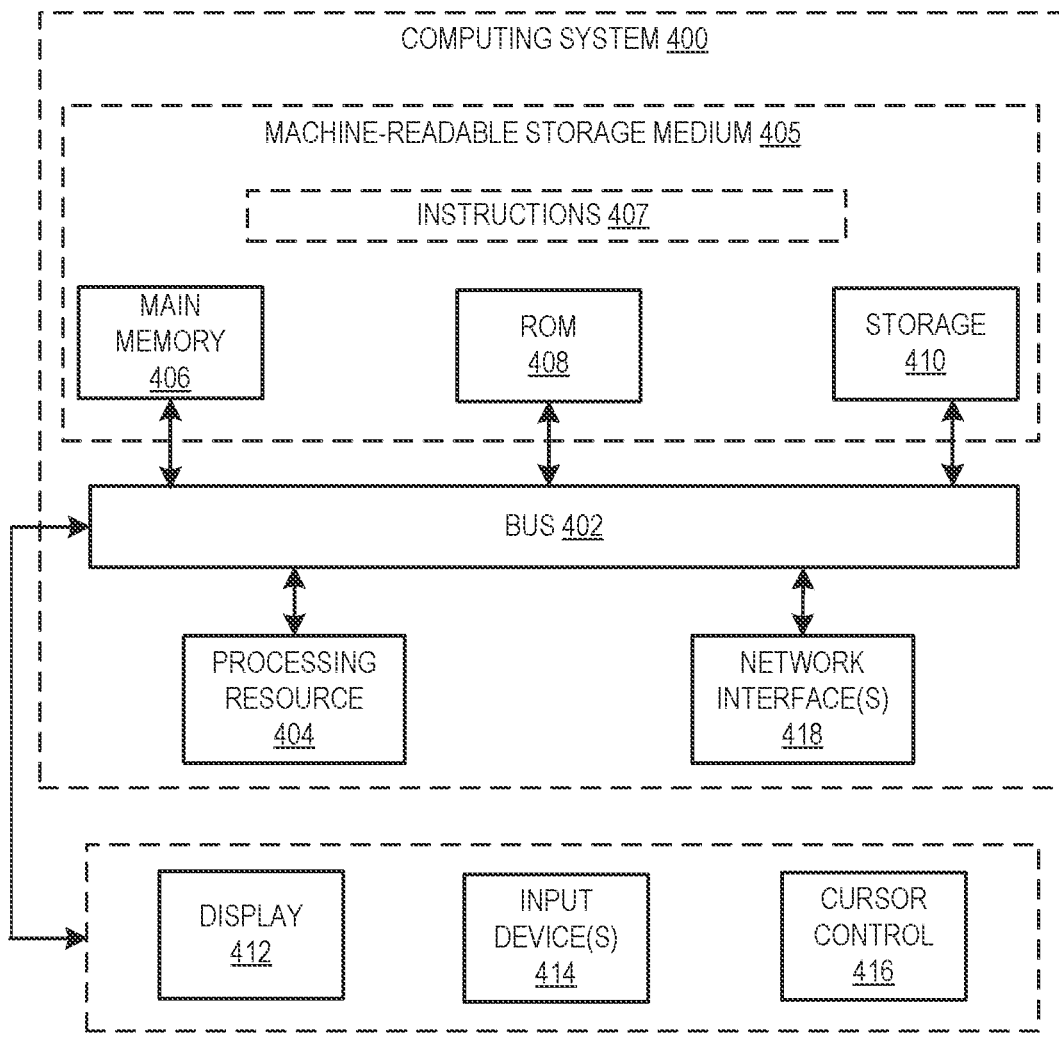
FIG. 4 depicts a block diagram of an example computing system.

FIG. 4 depicts a block diagram of an example computing system 400 in which various of the examples described herein may be implemented. In some examples, the computing system 400 may be configured to operate as a network management device, such as the network management device 104 of FIG. 1 and can perform various operations described in conjunction with one or more of the earlier drawings. In some other examples, the computing system 400 may be configured to operate as a WLAN controller, such as the controller 114 of FIG. 1, and can perform various operations described in one or more of the earlier drawings. Examples of the devices and/or systems that may be implemented as the computing system 400 may include, desktop computers, laptop computers, servers, web servers, authentication servers, AAA servers, DNS servers, DHCP servers, IP servers, VPN servers, network policy servers, mainframes, tablet computers, e-readers, netbook computers, televisions and similar monitors (e.g., smart TVs), content receivers, set-top boxes, PDAs, mobile phones, smartphones, smart terminals, dumb terminals, virtual terminals, video game consoles, virtual assistants, IoT devices, and the like.

The computing system 400 may include a bus 402 or other communication mechanisms for communicating information, a hardware processor, also referred to as processing resource 404, and a machine-readable storage medium 405 coupled to the bus 402 for processing information. In some examples, the processing resource 404 may include one or more CPUs, semiconductor-based microprocessors, and/or other hardware devices suitable for retrieval and execution of instructions stored in the machine-readable storage medium 405. The processing resource 404 may fetch, decode, and execute instructions to manage the transmit powers of networking devices. As an alternative or in addition to retrieving and executing instructions, the processing resource 404 may include one or more electronic circuits that include electronic components for performing the functionality of one or more instructions, such as an FPGA, an ASIC, or other electronic circuits.

In some examples, the machine-readable storage medium 405 may include a main memory 406, such as a RAM, cache and/or other dynamic storage devices, coupled to the bus 402 for storing information and instructions to be executed by the processing resource 404. The main memory 406 may also be used for storing temporary variables or other intermediate information during the execution of instructions to be executed by the processing resource 404. Such instructions, when stored in storage media accessible to the processing resource 404, render the computing system 400 into a special-purpose machine that is customized to perform the operations specified in the instructions. The machine-readable storage medium 405 may further include a read-only memory (ROM) 408 or other static storage device coupled to the bus 402 for storing static information and instructions for the processing resource 404. Further, in the machine-readable storage medium 405, a storage device 410, such as a magnetic disk, optical disk, or USB thumb drive (Flash drive), etc., may be provided and coupled to the bus 402 for storing information and instructions.

In some examples, the computing system 400 may be coupled, via the bus 402, to a display 412, such as a liquid crystal display (LCD) (or touch-sensitive screen), for displaying information to a computer user. In some examples, an input device 414, including alphanumeric and other keys (physical or software generated and displayed on a touch-sensitive screen), may be coupled to the bus 402 for communicating information and command selections to the processing resource 404. Also, in some examples, another type of user input device such as a cursor control 416 may be connected to the bus 402. The cursor control 416 may be a mouse, a trackball, or cursor direction keys. The cursor control 416 may communicate direction information and command selections to the processing resource 404 for controlling cursor movement on the display 412. In some other examples, the same direction information and command selections as cursor control may be implemented via receiving touches on a touch screen without a cursor.

In some examples, the computing system 400 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

The computing system 400 also includes a network interface 418 coupled to bus 402. The network interface 418 provides a two-way data communication coupling to one or more network links that are connected to one or more local networks. For example, the network interface 418 may be an integrated services digital network (ISDN) card, cable modem, satellite modem, or a modem to provide a data communication connection to a corresponding type of telephone line. As another example, the network interface 418 may be a local area network (LAN) card or a wireless communication unit (e.g., Wi-Fi chip/module).

In some examples, the machine-readable storage medium 405 (e.g., one or more of the main memory 406, the ROM 408, or the storage device 410) stores instructions 407 which when executed by the processing resource 404 may cause the processing resource 404 to execute one or more of the methods/operations described hereinabove. The instructions 407 may be stored on any of the main memory 406, the ROM 408, or the storage device 410. In some examples, the instructions 407 may be distributed across one or more of the main memory 406, the ROM 408, or the storage device 410. In some examples, the instructions 407 may include instructions that when executed by the processing resource 404 may cause the processing resource 404 to perform one or more of the methods described in FIGS. 2, 3A, and 3B.

Terms and phrases used in this document, and variations thereof, unless otherwise expressly stated, should be construed as open-ended as opposed to limiting. As examples of the foregoing, the term "including" should be read as meaning "including, without limitation" or the like. The term "example" is used to provide exemplary instances of the item in the discussion, not an exhaustive or limiting list thereof. The terms "a" or "an" should be read as meaning "at least one," "one or more" or the like. The presence of broadening words and phrases such as "one or more," "at least," "but not limited to" or other like phrases in some instances shall not be read to mean that the narrower case is intended or required in instances where such broadening phrases may be absent. Further, the term "and/or" as used herein refers to and encompasses any and all possible combinations of the associated listed items. It will also be understood that, although the terms first, second, third, etc., may be used herein to describe various elements, these elements should not be limited by these terms, as these terms are only used to distinguish one element from another unless stated otherwise or the context indicates otherwise.

What is claimed is:

1. A method comprising: determining, by a first access point (AP), scanning parameter values corresponding to a plurality of second access points (APs) based on previously performed Fine Timing Measurement (FTM) scans for the plurality of second APs, wherein the scanning parameter values comprise at least a count of failed FTM scans;
   determining, by the first AP, weights corresponding to the plurality of second APs based at least on the count of failed FTM values;
   selecting, by the first AP, a first set of target APs from the plurality of second APs based on the weights;
   scanning, by the first AP, the first set of target APs for a first FTM scan cycle;
   updating, by the first AP, the weights of the plurality of second APs after completion of the first FTM scan cycle to generate updated weights;
   selecting, by the first AP, a second set of target APs from the plurality of second APs based on the updated weights, wherein the second set of target APs comprises one or more target APs different from the first set of target APs; and
   scanning, by the first AP, the second set of target APs for a second FTM scan cycle.

2. The method of claim 1, further comprising identifying, by the first AP, the plurality of second APs from neighbor APs of the first AP based on an FTM support of the neighbor APs.

3. The method of claim 1, wherein the scanning parameter values further comprise a count of FTM scans performed and a wireless signal strength.

4. The method of claim 3, further comprising recording the count of FTM scans performed, the count of failed FTM scans, the wireless signal strength based on a predetermined number of the previously performed FTM scans, wherein the weights corresponding to the plurality of second APs are determined based on respective values of the count of FTM scans performed, the count of failed FTM scans, and the wireless signal strength.

5. The method of claim 3, wherein determining the weights comprises:
   for each second AP of the plurality of second APs:
      generating a first sum of the count of FTM scans and the count of failed FTM scans; and
      generating a second sum of the wireless signal strength and the first sum.

6. The method of claim 5, wherein generating the first sum comprises:
   generating a third sum of the count of FTM scans and the count of failed FTM scans; and
   multiplying the third sum with a multiplication factor.

7. The method of claim 6, wherein the multiplication factor is a predefined value.

8. The method of claim 6, wherein the multiplication factor is determined based on a range of wireless signal strength, wherein the wireless signal strength is measured as a received signal strength indicator (RSSI) at the first AP.

9. The method of claim 1, wherein selecting the first set of target APs comprises selecting two or more of the plurality of the second APs based on the weights.

10. The method of claim 1, wherein selecting the first set of target APs comprises selecting a single AP of the second APs having the lowest weight.

11. The method of claim 1, wherein scanning the first set of target APs during the first FTM scan cycle and the second set of target APs during the second FTM scan cycle relieves the rest of the plurality of second APs from participating in the first FTM scan cycle and the second FTM scan cycle, respectively, thereby reducing performance impact on the rest of the plurality of second APs.

12. The method of claim 1, wherein the first AP and the plurality of second APs support the Institute of Electrical and Electronics Engineers (IEEE)802.11mc Specification.

13. A wireless station, comprising:
   a machine-readable storage medium storing instructions; and
   a processing resource coupled to the machine-readable storage medium, wherein the processing resource is configured to execute one or more of the instructions to:
      determine scanning parameter values corresponding to a plurality of APs based on previously performed FTM scans for the plurality of APs wherein the scanning parameter values comprise at least a count of failed FTM scans;
      determine weights corresponding to the plurality of APs based at least on the count of failed FTM values;
      select a first set of target APs from the plurality of APs based on the weights;
      scan the first set of target APs for a first FTM scan cycle;
      update the weights of the plurality of APs after completion of the first FTM scan cycle to generate updated weights;
      select a second set of target APs from the plurality of APs based on the updated weights, wherein the second set of target APs comprises one or more target APs different from the first set of target APs; and
      scan the second set of target APs for a second FTM scan cycle.

14. The wireless station of claim 13, wherein the scanning parameter values further comprise a count of FTM scans performed and a wireless signal strength, and wherein, to determine the weights, the processing resource is configured to execute one or more of the instructions to:
   for each AP of the plurality of APs:
      generate a first sum of the count of FTM scans and the count of failed FTM scans; and
      generate a second sum of the wireless signal strength and the first sum.

15. The wireless station of claim 14, wherein, to generate the first sum, the processing resource is configured to execute one or more of the instructions to:
   generate a third sum of the count of FTM scans and the count of failed FTM scans; and
   multiply the third sum with a multiplication factor.

16. A system comprising:

a first AP; and a plurality of neighbor APs of the first AP, wherein the first AP is configured to:

identify a plurality of second APs from the neighbor APs based on FTM capabilities of the neighbor APs;

determine scanning parameter values corresponding to a plurality of second APs based on previously performed FTM scans for the plurality of second APs, wherein the scanning parameter values comprise at least a count of failed FTM scans;

determine weights corresponding to the plurality of second APs based at least on the count of failed FTM values;

select a first set of target APs from the plurality of second APs based on the weights;

scan the first set of target APs for a first FTM scan cycle;

update the weights of the plurality of second APs after completion of the first FTM scan cycle to generate updated weights;

select a second set of target APs from the plurality of second APs based on the updated weights, wherein the second set of target APs comprises one or more target APs different from the first set of target APs; and scan the second set of target APs for a second FTM scan cycle.

17. The system of claim 16, wherein the scanning parameter values further comprise a count of FTM scans performed and a wireless signal strength, and wherein, to determine the weights, the first AP is configured to:

for each second AP of the plurality of second APs:

generate a first sum of the count of FTM scans and the count of failed FTM scans; and generate a second sum of the wireless signal strength and the first sum.

18. The system of claim 17, wherein, to generate the first sum, the first AP is configured to:

generate a third sum of the count of FTM scans and the count of failed FTM scans; and multiply the third sum with a multiplication factor.

19. The system of claim 18, wherein use of the count of FTM scans performed, the count of failed FTM scans, and the multiplication factor in determining the weights of the plurality of APs provides an opportunity for a majority of the plurality of APs or each of the plurality of APs to be selected for FTM scanning.

20. The system of claim 16, wherein the first set of target APs comprises two or more of the plurality of the second APs having smaller weights than a threshold value.

* * * * *